March 13, 1945. P. A. SCOTT-IVERSEN 2,371,554
BRAKE
Filed Oct. 2, 1939

Inventor,
P. A. Scott-Iversen
By: Glascock Downing & Seebold

Patented Mar. 13, 1945

2,371,554

UNITED STATES PATENT OFFICE 2,371,554

BRAKE

Poul Arne Scott-Iversen, Coventry, England, assignor to The Rover Company Limited, Coventry, England Application October 2, 1939, Serial No. 297,575
In Great Britain October 1, 1938

5 Claims. (Cl. 188—152)

(Granted under the provisions of sec. 14, act of March 2, 1927; 357 O. G. 5)

This invention relates to vehicle brakes which depend for their action on the friction between the surfaces of relatively movable parts, such as a drum and shoes. The brakes ordinarily used on vehicles comprise a rotary drum, a pair of shoes for exerting a frictional retarding force on the drum, means for moving the shoes into contact with the drum, and a strong spring for retracting the shoes and holding them in the normal or idle position against stops. Such brakes are so constructed that when not in action a space, or clearance, exists between the friction surfaces of the shoes and drum, the surfaces being only brought together when it is required to apply the brake. This clearance is a variable quantity and is affected by wear of the friction surfaces, and by expansion or contraction of the brake members following upon temperature variations.

An undesirable result of increase of clearance due to wear or expansion is that the amount of movement which must be given to the brake actuating mechanism, such as a pedal or hand lever, to bring the brake into action is also increased, and in an extreme case the clearance may become so large as to prevent proper actuation of the brake within the normal range of movement of the pedal or hand lever. On the other hand when the shoes are closely adjusted and the clearance is small a sudden variation of temperature of the drum or shoes may bring the brake surfaces into contact with sufficient pressure to set up undesirable frictional resistance.

This problem of clearance-variation in brakes is well known and many attempts have been made to maintain automatically a constant clearance.

The object of the present invention is to enable the effects of wear, and of temperature changes, to be accommodated automatically in an improved manner.

The invention comprises a brake having a system of coacting friction surfaces and operating means, in which (when the brake is mounted in position on the vehicle) there exists a force, or a resultant of a plurality of forces, which will, or would in the absence of a greater frictional force inherent in the system, hold the said surfaces (or parts of them) in light contact when the brake is idle.

The invention also comprises a brake as defined in the preceding paragraph and in which the means for applying the actuating force to the system has no operative connection with the system when the brake is idle.

In particular the invention comprises the combination of the following essential parts, namely: (1) a rotary brake member having a braking surface, (2) actuable means adapted to co-operate with the said surface, (3) brake-applying means acting on the actuable means and movable in either direction from the idle position (i. e., position occupied when the brake is idle) and (4) means for applying to the brake-applying means the brake actuating force and having no operative connection with the brake-applying means when the brake is idle; the said combination being adapted to set up, or having combined with it means for setting up, a substantially constant force or resultant of forces in the same direction as the brake-actuating force, which constant force, or resultant of forces, when the brake is idle is, or would be in the absence of a greater frictional force inherent in the system, sufficient to hold the actuable means (or a part or parts of them) lightly in contact with the rotary member.

The invention also comprises the combination of a brake drum, a shoe or shoes adapted to co-operate with the drum, elastically deformable fluid operable means including a cylinder and at least one piston in operative connection with the shoe or shoes, and means operable by the driver for imparting the brake-applying force, the latter means having no operative connection with the brake when the brake is idle.

In the accompanying sheet of explanatory drawings—

Figure 1:
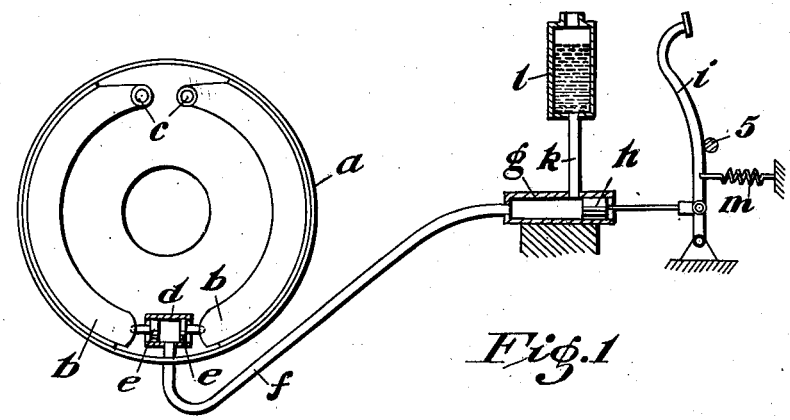
Figure 1 is a diagrammatic view illustrating one mode of carrying the invention into effect.

Referring to Figure 1, $a$ is the rotary member of the brake, this being in the form of the usual drum adapted to be mounted on a vehicle road wheel, and the braking surface being around the inner periphery of the drum. Within the drum are mounted a pair of brake shoes $b$, these forming in this example the actuable members of the brake. Each of the shoes is mounted by pivots at its upper end $c$ on a member carried by the vehicle framework. The pivot axes may be either fixed or floating. Between the opposite and free ends of the shoes is arranged a hydraulic cylinder $d$ fixedly mounted on a stationary part and containing pistons $e$ adapted to exert pressure on the adjacent free ends of the shoes, the pistons being the brake-applying means.

The shoes are so arranged within the drum that their outer friction surfaces are in constant contact with the inner peripheral friction surface of the drum, and are also so arranged that the pressure between those surfaces when the brake is idle is negligibly small.

The cylinder $d$ is connected at a position between the pistons by a pipe $f$ to a cylinder $g$ containing a piston $h$, this latter being operable by a pedal (or other lever) $i$ which serves as the means for applying the brake actuating force exerted by the driver through the medium of fluid contained in the pipe $f$, cylinder $d$ and the pistons $e$. When the piston $h$ is in its initial or idle position as shown in the diagram the cylinder $g$ is in open communication by a pipe $k$ with a replenishing chamber $l$ containing brake actuating liquid. The piston $h$ and lever $i$ have, therefore, no operative connection with the brake applying means when in that position. Brake actuating force can only be applied after the piston $h$ has closed the lower end of the pipe $k$.

The contact pressure between the friction surfaces of the brake part $a$, $b$ when the brake is idle, is substantially constant and may be determined by a variety of means. Thus, for example, the shoes may be so shaped and/or their pivot axes so disposed that the shoes tend by gravity to maintain themselves in light contact with the drum. In the example shown the contact pressure is produced at least in part hydraulically, by disposing the chamber $l$ at an appropriate height above the brake cylinder $d$, the head of liquid in the system being then relied upon (wholly or mainly) to hold the shoe in constant light contact with the drum. Any convenient combination of gravity, spring, or hydraulic forces may, however, be used, provided that the pressure exerted on the shoes is not sufficient to set up undesirable friction when the brake is idle and provided also that this pressure shall be sufficient at all times to prevent the shoes from moving away from the drum under the influence of vibration or road shocks.

It will be readily understood from the foregoing description that the shoes $b$ are at all times free to maintain themselves in contact with the drum to compensate the effect of wear, and also to advance or recede with the drum to accommodate expansion or contraction due to sudden temperature changes.

To bring the brake into action, the piston $h$ is pressed inwards by the pedal $i$. The first effect of this movement is to cause oil to be displaced from the cylinder $g$ to the chamber $l$. Subsequently, and after the piston $h$ has interrupted the connection between the chamber $l$ and pipe $f$ the pressure exerted on the piston is transmitted through the liquid in the pipe $f$ and cylinder $d$ to the pistons $e$, and the latter are caused to set up the desired increase of pressure between the surfaces of the shoes $b$ and drum $a$. On releasing the pressure on the pedal $i$ and allowing it to return to a stop 5 under the action of a spring $m$ situated in any convenient position such as in connection with the pedal, or in front of the piston $h$, the latter returns and re-establishes the communication between the replenishing chamber $l$ and the cylinder $d$. Any liquid which may be lost by leakage from the cylinder $d$, pipe $f$ and cylinder $g$ is automatically replenished from the supply in the chamber $l$, and the system is therefore always ready for immediate action and the amount of movement which must be imparted to the pedal $i$ to operate the brake is constant, all variations which may occur in the brake by wear or temperature changes being automatically accommodated by the freedom of the shoes.

It may be thought to be a retrograde step to maintain the friction surfaces of the brake parts in constant contact, and that undesirable resistance and heating will inevitably be produced when the brake is idle, but it has been found that these conditions do not result, and that both the resistance and the heating due to constant contact of the surfaces are negligibly small when the pressure between them while the brake is idle is sufficiently small.

For some purposes it may be preferred to arrange for the shoes to be slightly separated from the drum when the brake is idle, and this condition may be satisfied without departing from the essential feature of the invention.

Figure 2:
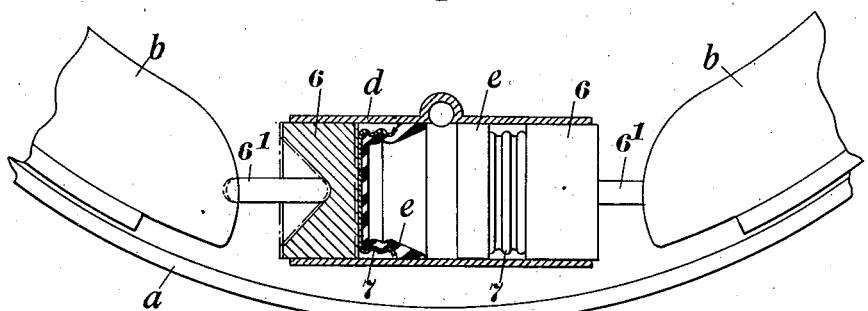
Fig. 2 is an enlarged diagrammatical sectional view of a portion of the structure and illustrating one preferred type of piston for use with the hydraulic cylinder.

A mode of satisfying the above-mentioned condition will readily be understood with the aid of Figure 2. Here there is shown (to a larger scale than in Figure 1) a portion of the drum $a$ and shoes $b$, the cylinder $d$ and pistons $e$, the latter being biassed in the direction for causing frictional engagement of the shoes with the drum by the hydraulic pressure constantly acting on the pistons. Each piston $e$ is made from rubber or elastically deformable material and arranged in combination with metal thrust pieces 6, $6^1$ which transmit the motion of the piston to the corresponding shoe. Each piston is made cup-like as shown and part of the circumference of the piston exerts a frictional grip on and makes a fluid-tight contact with the cylinder, the mutually contacting surfaces of the piston and drum acting as friction means for opposing the hydraulic pressure acting on the pistons. The closed end portion of the piston in contact with the thrust piece is made to a bellows-like form which imparts a certain amount of endwise elastic flexibility to the piston. This part of the piston may be reinforced by a thin elastically deformable metal sheath 7. When the brake applying means are operated to increase the hydraulic pressure constantly acting on the piston one effect of this pressure is to increase the frictional grip of the piston on the cylinder and another effect is to cause the closed end of the piston to extend and move the thrust piece to a position such as is indicated by dotted lines (at the left hand side of the drawing) without moving relatively to the cylinder the portion of the piston in contact with the cylinder. This extension of the piston may be sufficient to bring the brake fully into action, but if not the piston will move as a whole along the cylinder until the full braking effect is obtained. On releasing the brake applying means the piston will resume its initial form without any return movement as a whole in the cylinder, and this resumption of form will allow the brake shoes to separate slightly from the drum.

Figure 3:
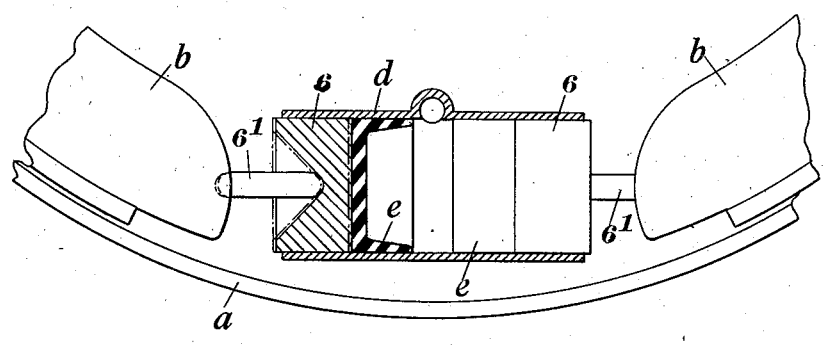
Fig. 3 is a similar view of a modification.

Instead of providing each piston with an extensible closed end as shown in Figure 2, I may use a flat ended piston as shown in Figure 3. In this case the frictional grip of the periphery of the piston on the cylinder when the brake-actuating pressure is exerted is such that the pressure will bulge the closed end of the piston as indicated by the dotted lines before moving the piston as a whole, and so produce the same effect as was described in connection with Figure 2.

In the brakes ordinarily used on vehicles the shoes are, when the brake is idle, biassed away from the drum, in that they are subject to the action of a spring sufficiently strong to pull the shoes away from the drum into contact with the stops. Consequently the clearance between the drum and shoes is necessarily variable. On the contrary brakes embodying my invention are, so far as I am aware, distinguished from all other vehicle brakes in that the shoes are, when the brake is in the idle condition, biassed towards the drum. That is to say, they are subject to a force which tends to hold the shoes in contact with the drum, and does in fact hold them (wholly or in part) in contact with the drum excepting in those examples in which sufficient friction exists to prevent such action and in which elastic deformation of fluid actuated means allows the shoes to be retracted slightly on release of the brake-actuating force. Consequently the brake adjustment remains constant and is independent of wear or thermal conditions.

The invention is not limited to the examples above described and subordinate details can be varied to suit different requirements.

By this invention I am able not only to compensate automatically in a simple and convenient manner the effects of brake wear, and of expansion and contraction due to temperature changes, but I am also able to employ advantageously higher brake leverages than are ordinarily practicable as the clearance between the shoes and drum is at all times either non-existent or is of a small and constant amount.

Having thus described my invention what I claim as new and desire to secure by Letters Patent is:

1. A vehicle brake having in combination relatively rotatable members provided with complementary friction surfaces, brake-applying means adapted under the action of a brake-applying force to cause frictional interengagement of the said surfaces, means whereby the brake-applying means are biassed in the direction for applying the brake when the latter is idle, means which exert frictional opposition to the action of the biassing means, and actuating means for imparting the brake-applying force to the brake-applying means.

2. A vehicle brake comprising the combination of a rotary member having a friction surface, actuable friction means adapted to cooperate with the rotary member, brake-applying means adapted under the action of a brake-applying force to act on the actuable means in the direction for causing frictional engagement thereof with the friction surface of the rotary member and thereby apply the brake, means whereby the brake-applying means are biassed in the direction for applying the brake when the latter is idle, means which exert frictional opposition to the action of the biassing means, and actuating means for imparting the brake-applying force to the brake-applying means, the said actuating means having no operative connection with the brake-applying means when the brake is idle.

3. A vehicle brake comprising the combination of a rotary drum, a pair of shoes adapted to co-operate with the drum, brake applying means adapted under the action of a brake-applying force to act on the shoes in the direction for causing frictional engagement thereof with the drum and thereby apply the brake, means whereby the brake-applying means are biassed in the direction for applying the brake when the latter is idle, means which exert frictional opposition to the action of the biassing means, and actuating means for imparting the brake-applying force to the brake-applying means.

4. A vehicle brake comprising the combination of a rotary drum, at least one shoe adapted to co-operate with the drum, elastically deformable fluid operable means including a cylinder and at least one piston adapted under the action of a brake-applying force to cause the shoe to co-operate with the drum, the said means exerting frictional resistance to relative movement of the cylinder and piston and being biassed in the direction for applying the brake when the latter is idle, and actuating means operable by the driver for imparting the brake-applying force to the fluid operable means, the actuating means having no operative connection with the fluid operable means when the brake is idle.

5. A vehicle brake as claimed in claim 4, in which the piston of the fluid operable means is elastically deformable, the deformability being such as will allow a slight separation of the shoe from the drum when the brake is idle.

POUL ARNE SCOTT-IVERSEN.